US011384572B2

(12) United States Patent
Enomoto

(10) Patent No.: US 11,384,572 B2
(45) Date of Patent: Jul. 12, 2022

(54) DOOR LATCH DEVICE FOR VEHICLE AND DOOR SYSTEM PROVIDED WITH DOOR LATCH DEVICE

(71) Applicant: MITSUI KINZOKU ACT CORPORATION, Kanagawa (JP)

(72) Inventor: Daisuke Enomoto, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 208 days.

(21) Appl. No.: 15/111,664

(22) PCT Filed: Dec. 24, 2014

(86) PCT No.: PCT/JP2014/084165
§ 371 (c)(1),
(2) Date: Jul. 14, 2016

(87) PCT Pub. No.: WO2016/035225
PCT Pub. Date: Mar. 10, 2016

(65) Prior Publication Data
US 2016/0333615 A1 Nov. 17, 2016

(30) Foreign Application Priority Data

Sep. 4, 2014 (JP) .............................. JP2014-179807

(51) Int. Cl.
*B60J 1/17* (2006.01)
*E05B 79/08* (2014.01)
(Continued)

(52) U.S. Cl.
CPC ................ *E05B 81/01* (2013.01); *B60J 1/17* (2013.01); *B60J 5/00* (2013.01); *E05B 79/08* (2013.01);
(Continued)

(58) Field of Classification Search
CPC .......... E05B 81/01; E05B 79/08; E05B 81/72; E05B 81/76; E05B 81/70; E05F 15/70;
(Continued)

(56) References Cited

U.S. PATENT DOCUMENTS 5,535,607 A 7/1996 Dzurko et al.
5,810,423 A 9/1998 Brackmann et al.
(Continued)

FOREIGN PATENT DOCUMENTS

CN 1420251 A 5/2003
CN 103527014 A 1/2014
(Continued)

OTHER PUBLICATIONS

International Search Report issued in International Application No. PCT/JP2014/084165, dated Mar. 17, 2015, with English Translation.
(Continued)

Primary Examiner — Kristina R Fulton
Assistant Examiner — Thomas L Neubauer
(74) Attorney, Agent, or Firm — McDermott Will & Emery LLP

(57) ABSTRACT

A door latch device includes: a meshing mechanism configured to be meshable with a striker; a locking/unlocking mechanism configured to be movable to an unlock position where an opening operation of an operation handle provided at the door is enabled and where meshing of the meshing mechanism is releasable, and to be movable to a lock position where the opening operation of the operation handle provided at the door is disabled and where meshing of the meshing mechanism is unreleasable; a smart lever configured to be operable in linking with the opening operation of the operation handle when the locking/unlocking mechanism is in the unlock position, and to be inoperable in linking
(Continued)

with the opening operation of the operation handle when the locking/unlocking mechanism is in the lock position; and a smart lever detection switch configured to be detectable an operation of the smart lever.

2 Claims, 10 Drawing Sheets

(51) Int. Cl.
  *E05B 81/00* (2014.01)
  *E05B 81/70* (2014.01)
  *E05B 81/76* (2014.01)
  *E05B 81/72* (2014.01)
  *E05F 15/665* (2015.01)
  *B60J 5/00* (2006.01)
  *E05F 15/70* (2015.01)

(52) U.S. Cl.
  CPC .............. *E05B 81/70* (2013.01); *E05B 81/72* (2013.01); *E05B 81/76* (2013.01); *E05F 15/665* (2015.01); *E05F 15/70* (2015.01); *E05Y 2900/531* (2013.01); *E05Y 2900/55* (2013.01)

(58) Field of Classification Search
  CPC ... E05F 15/665; B60J 1/17; B60J 5/00; E05Y 2900/531; E05Y 2900/55
  See application file for complete search history.

(56) References Cited

U.S. PATENT DOCUMENTS

| 2002/0108310 A1 | 8/2002 | Schroer | |
| 2012/0136532 A1* | 5/2012 | Konchan | E05B 81/64 701/36 |
| 2014/0001778 A1* | 1/2014 | Yokomori | E05B 85/10 292/336.3 |
| 2016/0040457 A1 | 2/2016 | Yokomori et al. | |

FOREIGN PATENT DOCUMENTS

| DE | 10351424 A1 | 6/2004 |
| GB | 2396656 A | 6/2004 |
| JP | 2002-248938 A | 9/2002 |
| JP | 2004-82808 A | 3/2004 |
| JP | 2004-156330 A | 6/2004 |
| JP | 2011-069190 A | 4/2011 |

OTHER PUBLICATIONS

Office Action issued in corresponding Chinese Patent Application No. 201480073466.2, dated May 31, 2017 with English Translation.
Extended European Search Report issued in corresponding European Patent Application No. 14901187.6, dated Jul. 4, 2017.

* cited by examiner

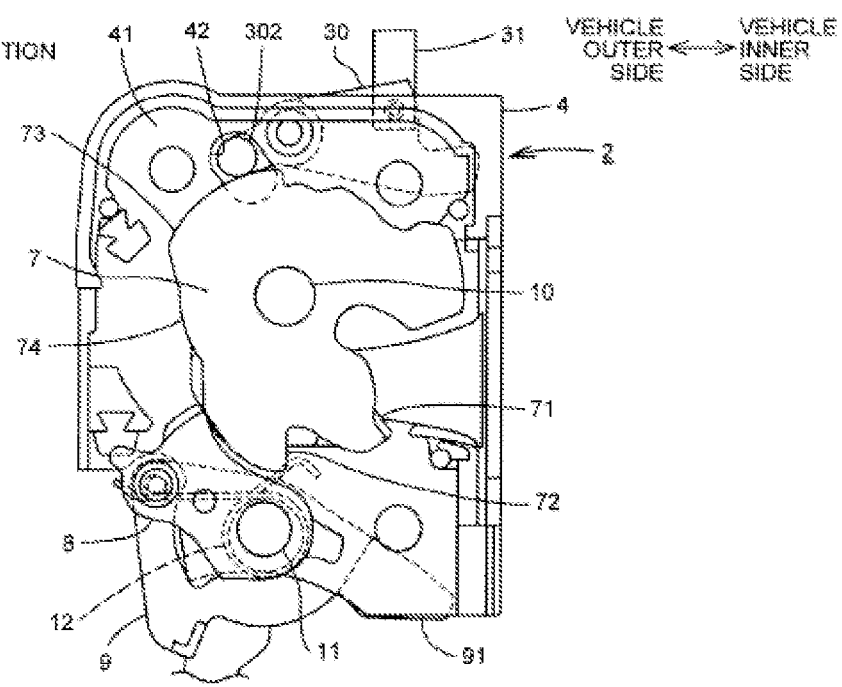
FIG.6 OPEN POSITION
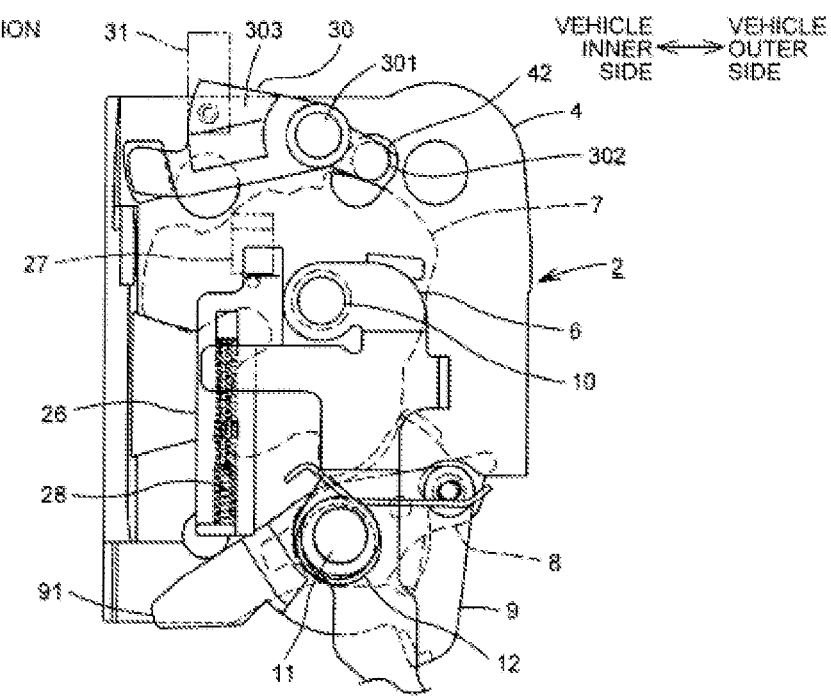
FIG.7 OPEN POSITION

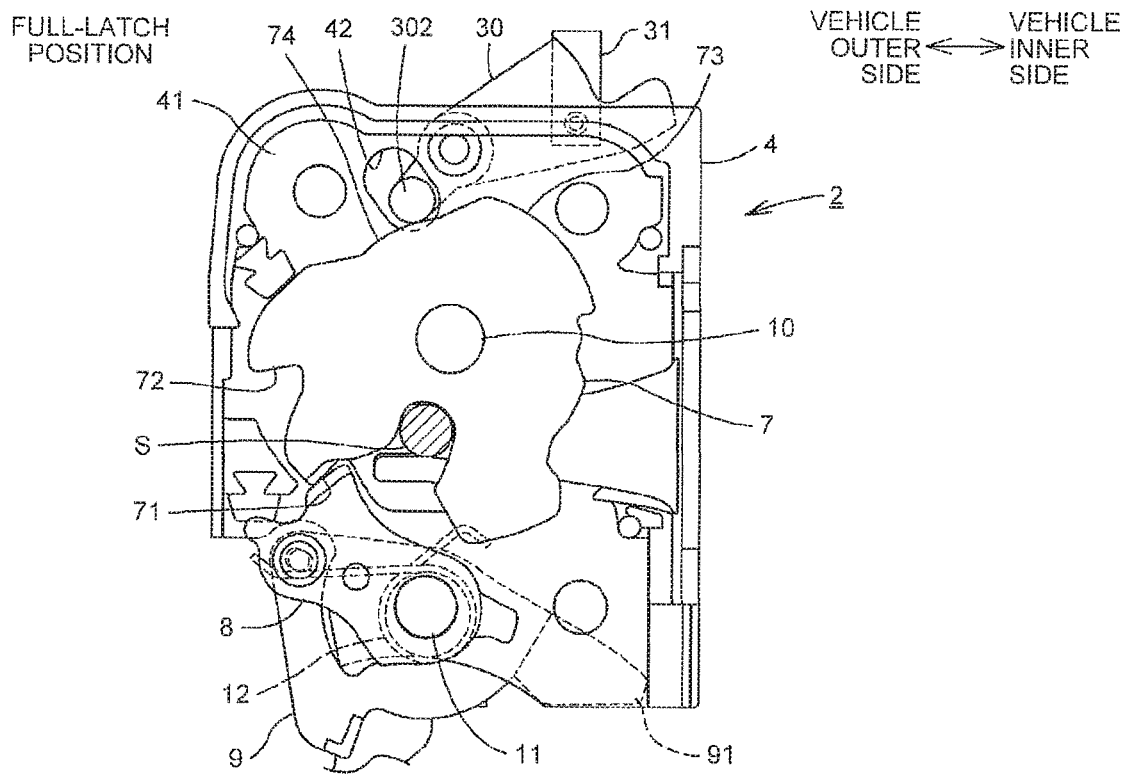
FIG.8 FULL-LATCH POSITION
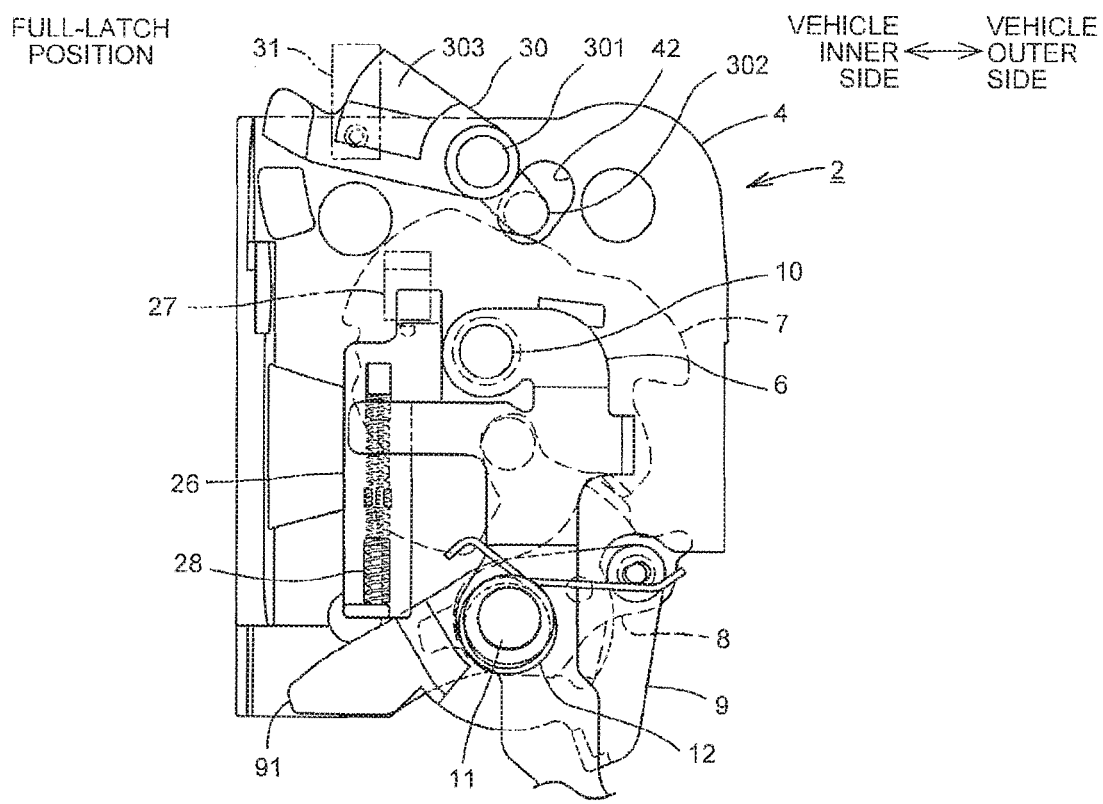
FIG.9 FULL-LATCH POSITION

UNLOCK POSITION

LOCK POSITION

UNLOCK POSITION

LOCK POSITION

DOOR LATCH DEVICE FOR VEHICLE AND DOOR SYSTEM PROVIDED WITH DOOR LATCH DEVICE

RELATED APPLICATIONS

This application is the U.S. National Phase under 35 U.S.C. § 371 of International Application No. PCT/JP2014/084165, filed on Dec. 24, 2014, which in turn claims the benefit of Japanese Application No. 2014-179807, filed on Sep. 4, 2014, the disclosures of which Applications are incorporated by reference herein.

FIELD

The present invention relates to a door latch device for vehicle, having a function for detecting a door-opening operation, and to a door system provided with the door latch device.

BACKGROUND

Among a vehicle door system that includes a door latch device for retaining a door in a closed state and includes a window regulator for causing a glass window to perform an opening and closing operation, there has been a system that, based on a door-opening operation, performs drive control of a driving source of a window regulator to cause the glass window to perform an opening operation automatically for a predetermined amount. This type of system has intended to improve a sealing property of a weather-strip on a sash-less door, or to prevent an increase of a closing force of the door due to a raised indoor pressure at the moment of closing of the door (refer to Patent Literature 1, for example).

CITATION LIST

Patent Literature

Patent Literature 1: Japanese Patent Application Laid-open No. 2004-82808

SUMMARY

Technical Problem

The opening operation of the glass window to open automatically for a predetermined amount based on the door-opening operation, as described above, needs to be executable only when following three conditions are satisfied in view of anti-theft property, and practicality. (1) the door is in a closed state (2) a locking/unlocking mechanism of the door latch device is in an unlock state and (3) door-opening operation is performed with an operation handle on the door for door-opening (outside handle or inside handle).

In order to allow the above-described operation to be executable only when the three conditions are satisfied, however, a lot of detection switches for detecting a state of each of components are required. In particular, since detecting an unlock position of the locking/unlocking mechanism of the door latch device, and detecting a door-opening operation, may need at least two detection switches, problems arise in some cases that the door latch device structure, or control of a control circuit device for controlling an electric driving source of the window regulator may become complicated.

In view of the above-described problems, the present invention is intended to provide a door latch device for vehicle capable of, using a detection switch, detecting a door-opening operation of an operation handle when a locking/unlocking mechanism is in an unlatch position, and a door system provided with the door latch device.

Solution to Problem

To solve the above-described problem, a first invention includes: a meshing mechanism configured to be meshable with a striker when a door is closed; a locking/unlocking mechanism configured to be movable to an unlock position where an opening operation of an operation handle provided at the door is enabled and where meshing of the meshing mechanism is releasable, and to be movable to a lock position where the opening operation of the operation handle provided at the door is disabled and where meshing of the meshing mechanism is unreleasable; a smart lever configured to be operable in linking with the opening operation of the operation handle when the locking/unlocking mechanism is in the unlock position, and to be inoperable in linking with the opening operation of the operation handle when the locking/unlocking mechanism is in the lock position; and a smart lever detection switch configured to be detectable an operation of the smart lever.

In the first invention, according to a second invention, the smart lever operates by abutting the locking/unlocking mechanism that operates in linking with the opening operation of the operation handle when the locking/unlocking mechanism is in the unlock position.

A third invention includes: the door latch device for vehicle according to the first invention or the second invention; a door open/close detection switch configured to be detectable closing of a door; a window regulator configured to be capable of opening and closing a glass window provided at the door using power of an electric driving source; and a control circuit device configured to control drive of the electric driving source. The control circuit device performs opening drive control of the electric driving source for a predetermined time, triggered by detection of operation of the smart lever by the smart lever detection switch when the door open/close detection switch is detecting the closing of the door, and performs closing drive control of the electric driving source triggered by detection of closing of the door by the door open/close detection switch.

Advantageous Effects of Invention

According to the present invention, there are provided a smart lever and a smart lever detection switch. The smart lever is operable in linking with an opening operation of the operation handle when the locking/unlocking mechanism is in an unlock position, and that is inoperable in linking with the opening operation of the operation handle when the locking/unlocking mechanism is in a lock position. The smart lever detection switch is detectable an operation of the smart lever. By using the smart lever detection switch, it is possible to reliably detect the door-opening operation of the operation handle when the locking/unlocking mechanism is in the unlock position.

Furthermore, by applying the door latch device having the smart lever and the smart lever detection switch to the door system having a window regulator, it is possible, with simple control, to cause the glass window to perform an opening operation automatically for a predetermined amount, in linking with the door-opening operation.

BRIEF DESCRIPTION OF DRAWINGS

FIG. 6 is a front view of a meshing unit in an open position.

FIG. 7 is a back view of the meshing unit in the open position.

FIG. 8 is a front view of the meshing unit in a full-latch position.

FIG. 9 is a back view of the meshing unit in the full-latch position.

DESCRIPTION OF EMBODIMENTS

Hereinafter, an embodiment of the present invention will be described with reference to the drawings.
(Basic Structure of Door Latch Device 1)

Before describing a structure of a door latch device 1, a door D equipped with the door latch device 1 and with a window regulator WR, according to the present invention, will be described.

Figure 1:
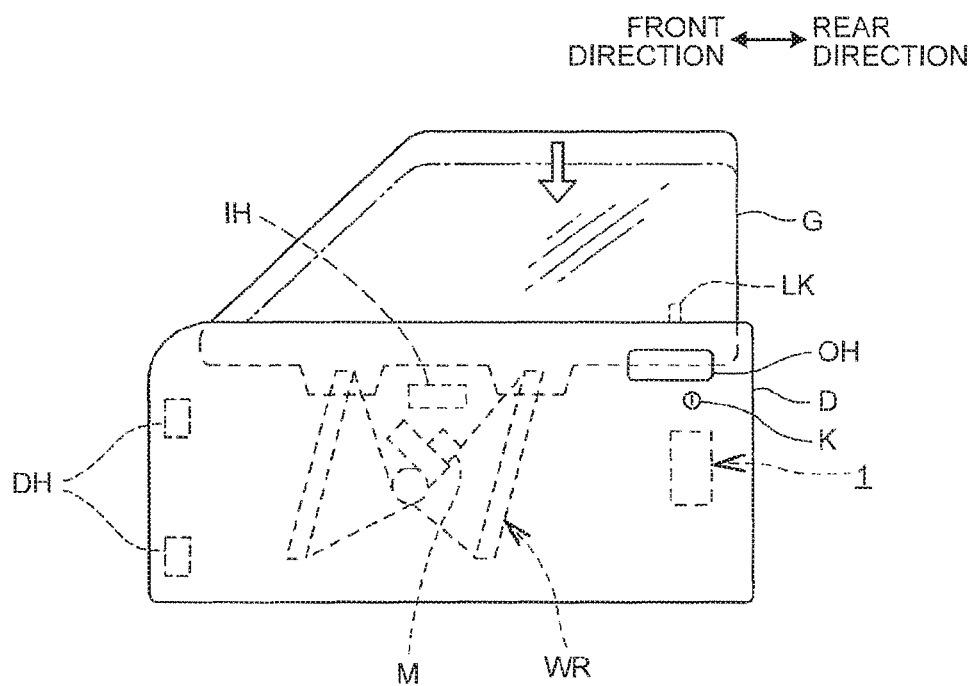
FIG. 1 is a schematic side view of a door for vehicle related to the present invention.
Figure 2:
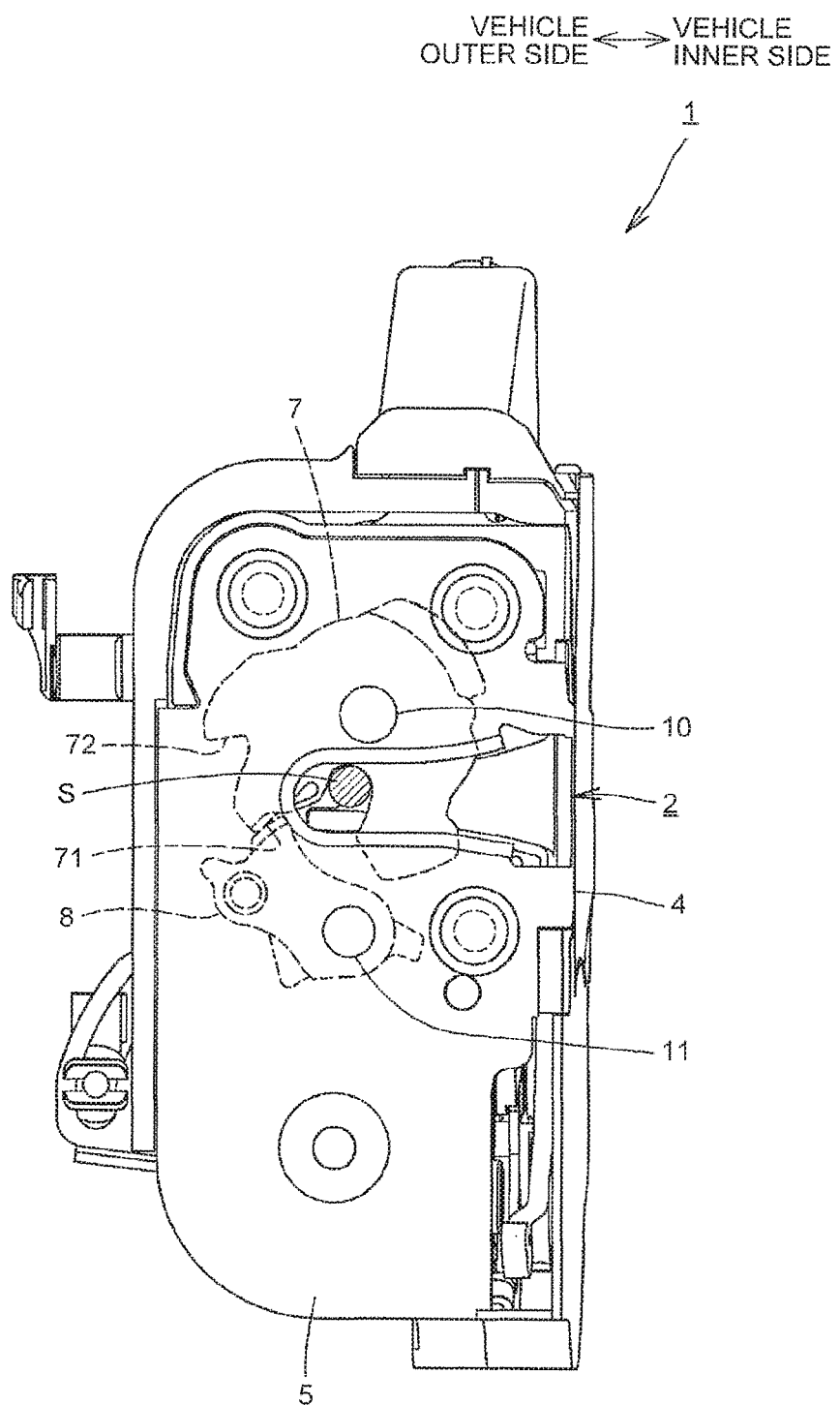
FIG. 2 is a front view of a door latch device.

As illustrated in FIG. 1, the door D has a sash-less structure and is openably/closeably and pivotally supported at a vehicle body by a door hinge DH having a rotation axis in a vertical direction at a front portion (left-hand side in FIG. 1). At an internal portion of the door D, the window regulator WR and the door latch device 1 are mounted. The window regulator WR is configured to support a glass window G openably and closeably in the vertical direction using a power of a motor M which is an electric driving source. The door latch device 1 is configured to retain the door D in a closed state. Furthermore, on the outside surface of the door D, an outside handle (operation handle) OH, and a key cylinder K are provided. The outside handle (operation handle) OH is operated when the door D is opened from vehicle outside. The key cylinder K is used for a locking and unlocking operation of a locking/unlocking mechanism to be described later. At the indoor side of the door D, an inside handle (operation handle) IH and a lock knob LK are provided. The inside handle IH is operated when the door D is opened from the vehicle inside. The lock knob LK is used for the locking and unlocking operation of the locking/unlocking mechanism from the vehicle inside. Note that since the door hinge DH and the window regulator WR are configured with known structures, description thereof will be omitted.

Next, a basic structure of the door latch device 1 will be described.

The door latch device 1 is mounted internally to the door D, and includes a meshing unit 2 and an operation unit 3, as illustrated in FIGS. 2 to 5. The meshing unit 2 is configured to retain the door D in a closed state. The operation unit 3 is configured to be mounted on the meshing unit 2.

The meshing unit 2, as illustrated mainly in FIGS. 2 and 6 to 9, includes a body 4, a cover plate 5, a base (no reference sign), a meshing mechanism (no reference sign), and an open lever 9, as main components. The body 4, made of synthetic resin, is fixed with bolts (not illustrated) at a rear end portion of the door D. The cover plate 5, made of metal, is used for closing an opening provided toward a rear-surface side of the body 4. The base includes a back plate 6 made of metal to be fixed at a front surface of the body 4. The meshing mechanism, being housed inside the base, includes a latch 7 that is meshable with a striker S that is to be fixed to the vehicle body side and a ratchet 8 that is engageable with the latch 7. The open lever 9 releases an engagement relation between the ratchet 8 and the latch 7. Note that in FIGS. 6 and 8, the cover plate 5 is omitted so as to clearly illustrate the meshing mechanism.

The body 4 includes, at a rear-surface side thereof, a recessed housing portion 41 for housing the latch 7 and the ratchet 8.

The latch 7 is housed in the housing portion 41 of the body 4 and is pivotally supported by the latch shaft 10 arranged in a front-rear direction, between the body 4 and the cover plate 5. As illustrated mainly in FIGS. 6 and 8, at a lower portion of an outer periphery of the latch 7, a full-latch engagement portion 71 and a half-latch engagement portion 72, that are engageable with the ratchet 8, are provided.

The latch 7, in linking with the closing operation of the door D, pivots from an open position (position illustrated in FIG. 6) clockwise against a biasing force of a spring (not illustrated), and then, pivots passing through a half-latch position to a full-latch position (position illustrated in FIG. 8). At the time of the opening operation of the door D, the latch 7 pivots in a reverse direction. The open position corresponds to an open state of the door D that is not meshed with the striker S. The half-latch position corresponds to a door-ajar state of the door D that is slightly meshed with the striker S. The full-latch position corresponds to a fully closed state of the door D that is fully meshed with the striker S.

The ratchet 8, being arranged below the latch 7 and housed in the housing portion 41 of the body 4, is pivotally supported by the ratchet shaft 11 arranged in the front-rear direction, between the body 4 and the cover plate 5. The ratchet 8, using a spring 12, is biased in an engagement direction (clockwise in FIGS. 6 and 8; direction to engage the full-latch engagement portion 71, and the half-latch engagement portion 72, of the latch 7). The ratchet 8, in linking with the pivoting of the latch 7, engages the full-latch engagement portion 71 of the latch 7 to retain the door D in a fully closed state, or engages the half-latch engagement portion 72 of the latch 7 to retain the door D in a door-ajar state.

The open lever 9 is pivotably supported at a front surface of the body 4, coaxially and integrally with the ratchet 8. The open lever 9 is provided with a released portion 91 at an end portion extending to a vehicle inner side (left-hand side in FIGS. 7 and 9).

Figure 3:
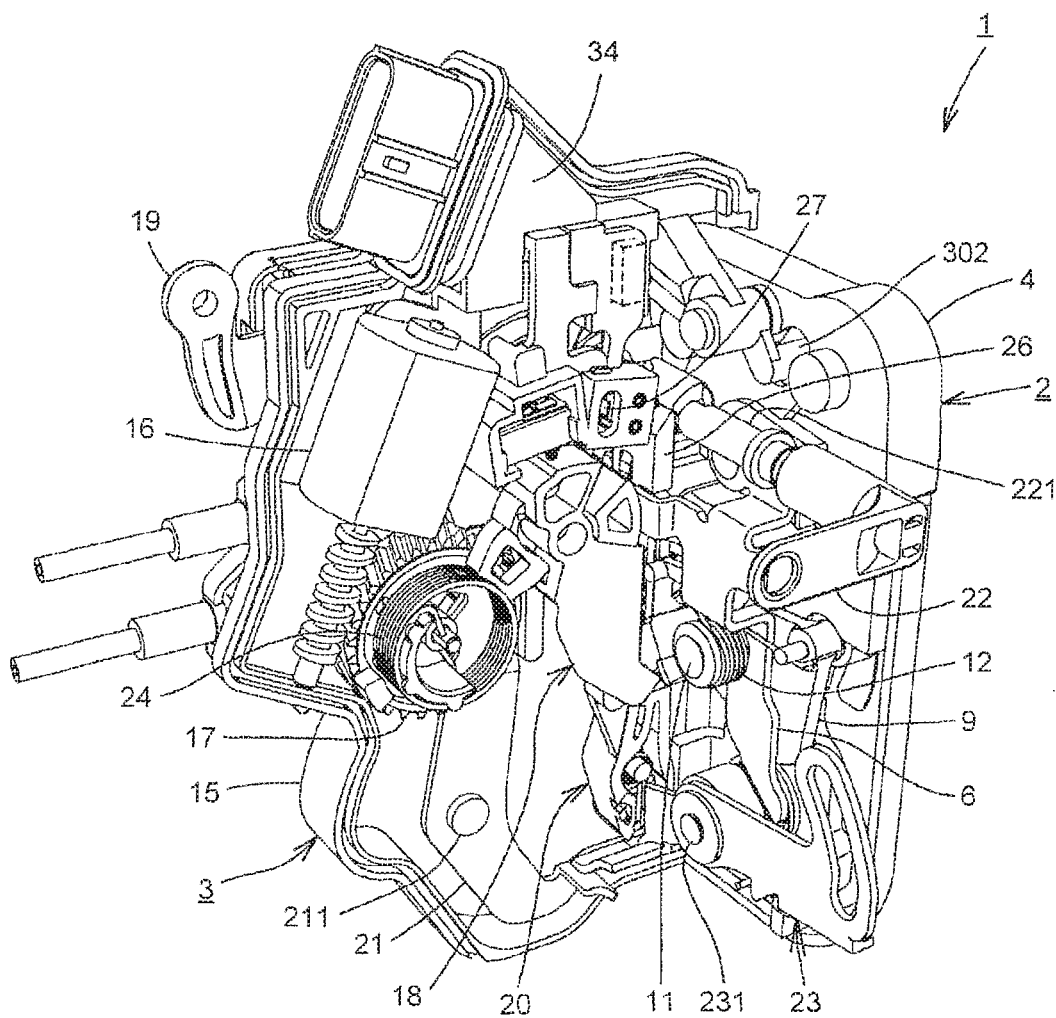
FIG. 3 is a perspective view of the same door latch device seen from the diagonally front side.
Figure 4:
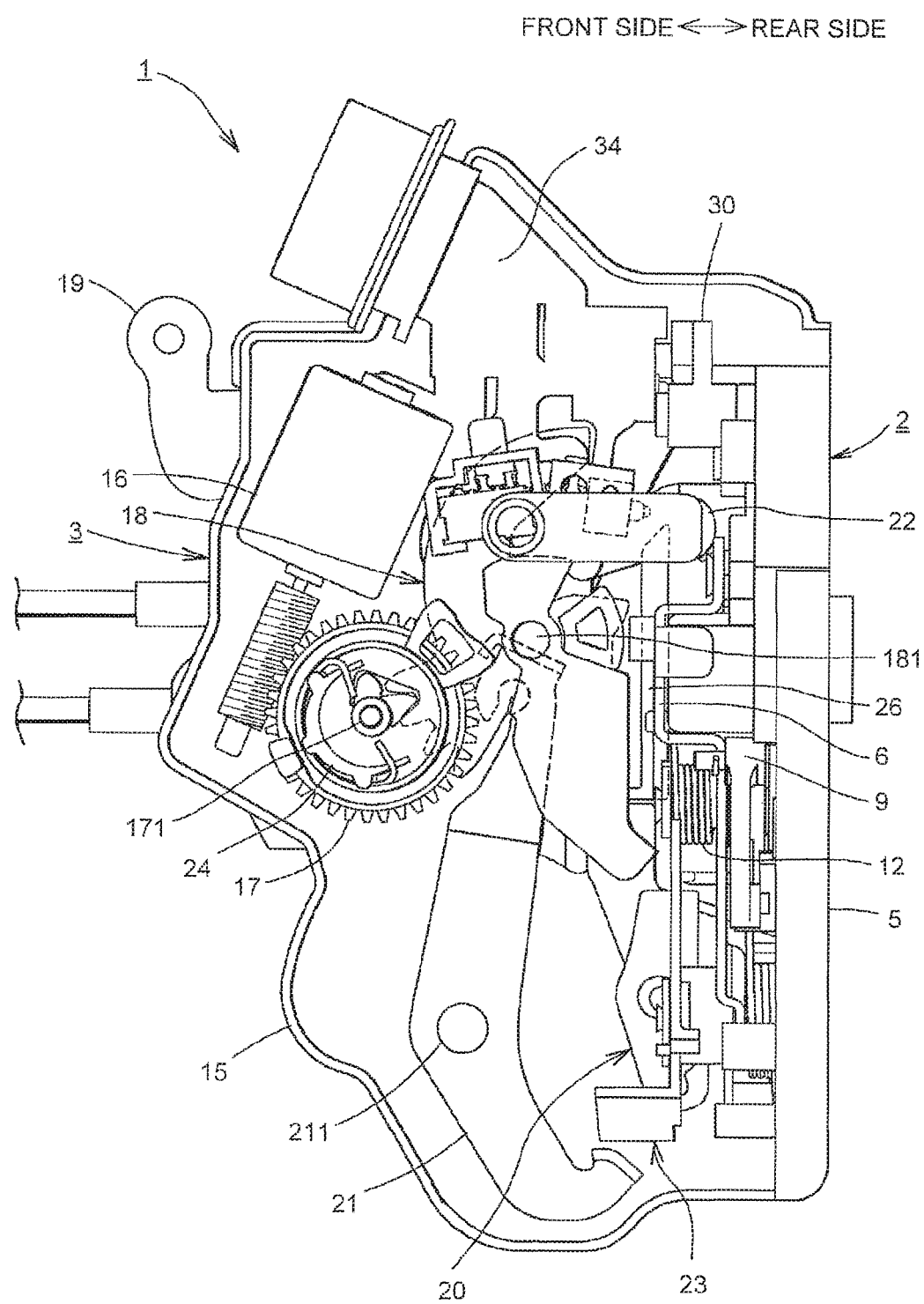
FIG. 4 is a side view of the same door latch device seen from a vehicle outer side.
Figure 5:
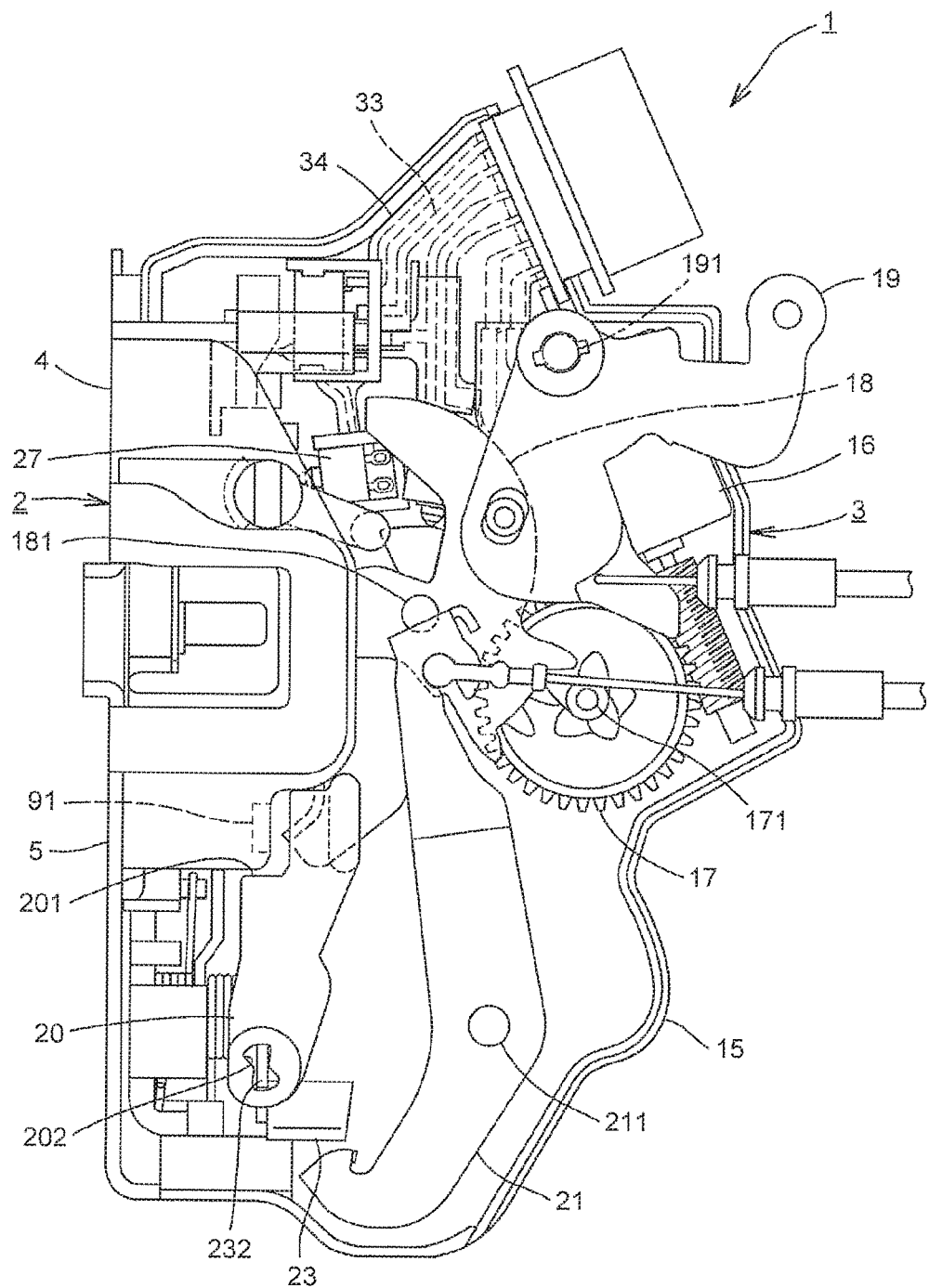
FIG. 5 is a side view of the same door latch device seen from the vehicle inner side.

As illustrated mainly in FIGS. 3 to 5, the operation unit 3 includes a casing 15 made of synthetic resin, to be fixed to the body 4, and an operation mechanism (no reference sign) to be housed in the casing 15. The operation mechanism includes, as main components, a motor 16, a worm wheel 17, a lock lever 18, a knob lever 19, an open link 20, an inside lever 21, a key lever 22, and an outside lever 23. The worm wheel 17 is rotatable in normal and reverse directions according to a rotation of the motor 16. The lock lever 18 is movable to an unlock position enabling the door-opening operation, and to a lock position disabling the door-opening operation. The knob lever 19 is configured to be coupled to the lock knob LK. The open link 20 is movable, with the lock lever 18, to the unlock and lock positions. The inside lever 21 is configured to be coupled to an inside handle IH. The key lever 22 is configured to be coupled to the key cylinder K. The outside lever 23 is configured to be coupled to an outside handle OH. The lock lever 18, the knob lever 19, and the open link 20 are components of the locking/unlocking mechanism according to the present embodiment.

Note that in FIGS. 3 to 5, the casing 15 made of synthetic resin, to be fixed so as to cover the front surface of the body 4, is partly omitted so as to clearly illustrate an internal structure of the operation unit 3.

The worm wheel 17 is pivotally supported by a shaft 171 arranged in a vehicle inner and outer direction. The worm wheel 17 rotates in forward direction or in reverse direction from a neutral position (position illustrated in FIGS. 4 and 5) against the biasing force of a spring 24 when the motor 16 rotates. When the motor 16 stops rotating, the worm wheel 17 returns to the neutral position from the rotated position by the biasing force of the spring 24.

The knob lever 19 is pivotally supported at the casing 15 by a shaft 191 displaced in the vehicle inner and outer direction. The knob lever 19, based on a manual operation of the lock knob LK, pivots to the unlock position, and the lock position reached after pivoting has been performed from the unlock position clockwise by a predetermined angle, as illustrated in FIG. 5.

The key lever 22 is pivotally supported by a shaft 221 arranged in the vehicle inner and outer direction. The key lever 22, based on a manual operation of the key cylinder K, pivots from the neutral position (position illustrated in FIG. 4) to the unlock and lock directions.

Figure 10:
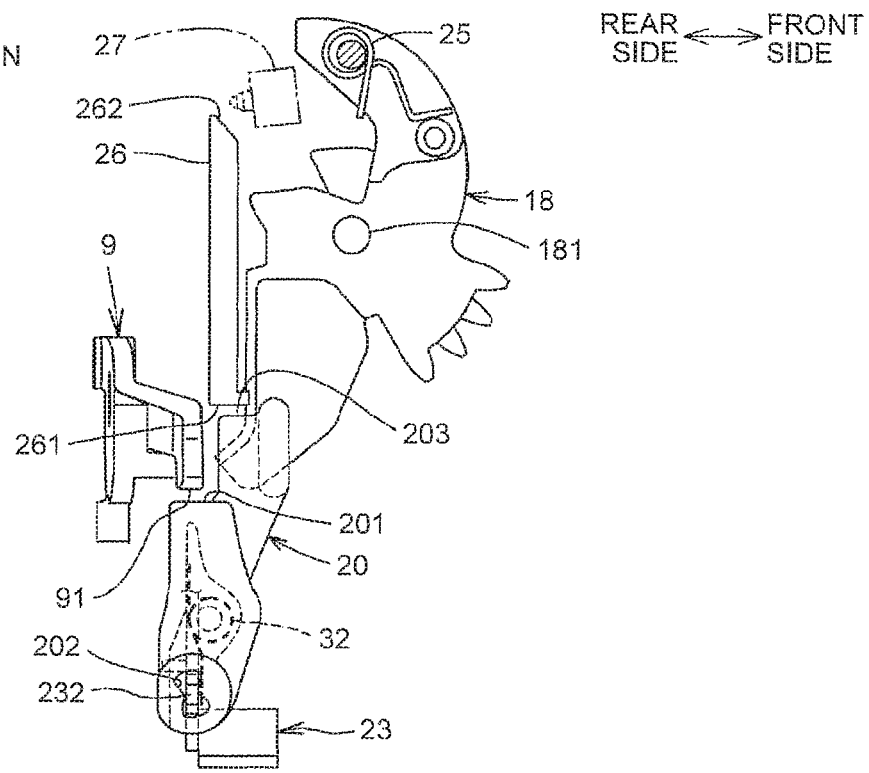
FIG. 10 is a side view of main portions when a locking/unlocking mechanism is in an unlock position.

The lock lever 18 is pivotally supported in the casing 15 by a shaft 181 displaced toward the vehicle inner and outer direction. The lock lever 18 is pivotable to the unlock position (position illustrated in FIGS. 4, 5, and 10) and the lock position (position illustrated in FIG. 11) by pivoting of the key lever 22 based on an operation of the key cylinder K, pivoting of the knob lever 19 based on the operation of the lock knob LK, and the pivoting of the worm wheel 17 based on the rotation of the motor 16. The unlock position of the lock lever 18 is a position where an opening operation of the outside handle OH and the inside handle IH are enabled. The lock position of the lock lever 18 is a position reached after pivoting has been performed from the unlock position counterclockwise for a predetermined angle, as illustrated in FIG. 10, that is a position where the opening operation of the outside handle OH and the inside handle IH are disabled. The lock lever 18 is elastically retained at each of the unlock and lock positions by the biasing force of a spring 25 supported at the casing 15.

The outside lever 23 is pivotally supported at the lower side of the body 4, by a shaft 231 arranged in the front-rear direction. The outside lever 23, based on the opening operation of the outside handle OH, performs a release operation by which a coupling portion 232 provided at an end portion on the vehicle inner side moves upwardly against the biasing force of a spring (not illustrated).

The open link 20 is provided with a connection hole 202 at a lower portion thereof, being coupled to the coupling portion 232 of the outside lever 23 pivotably for a predetermined angle in the front-rear direction. At the same time, an upper portion of the open link 20 is vertically-slidably coupled to the lock lever 18. The open link 20, in linking with the operation of the lock lever 18, pivots about the coupling portion 232 to the unlock position illustrated mainly in FIG. 10, and pivots to the lock position illustrated in FIG. 11, reached after pivoting has been performed by a predetermined angle counter-clockwise from the unlock position. At the same time, the open link 20 performs a release operation to move upwardly in linking with the release operation of the outside lever 23. At a substantially central portion in a vertical direction of the open link 20, a releasing portion 201 is provided, when in an unlock position, being capable of abutting the released portion 91 of the open lever 9 from the lower direction.

The inside lever 21 is pivotally supported by a shaft 211 arranged in the vehicle inner and outer direction. The inside lever 21, performs a release operation clockwise about the shaft 211, as illustrated in FIG. 5, based on the opening operation of the inside handle IH, and transmits the release operation to the open link 20 via the outside lever 23.

Figure 12:
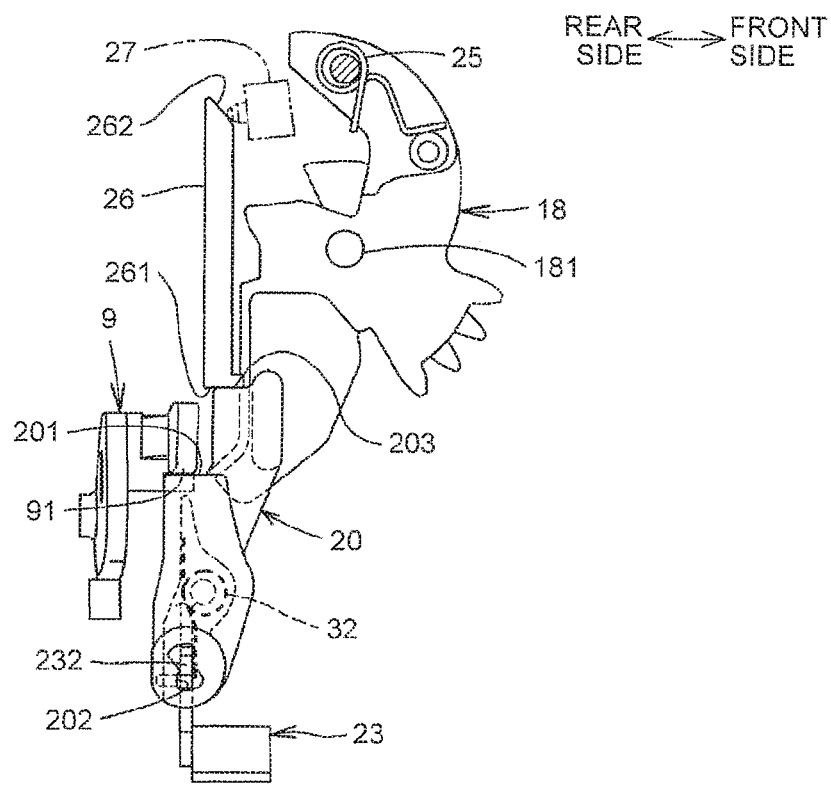
FIG. 12 is a side view of the main portions in a door-opening operation when the locking/unlocking mechanism is in the unlock position.

In a case where the door D is in a fully closed state and the locking/unlocking mechanism is in the unlock position as illustrated in FIG. 10, when the outside lever 23 performs a release operation based on the opening operation of the outside handle OH or the inside handle IH, the open link 20 performs the release operation upward from the unlock position, as illustrated in FIG. 12. When the open link 20 has performed the release operation, the releasing portion 201 abuts the released portion 91 of the open lever 9 from the lower direction, and the open lever 9 pivots in a release direction. Consequently, the engagement between the ratchet 8 and the full-latch engagement portion 71 of the latch 7 is released to enable opening of the door D.

Figure 11:
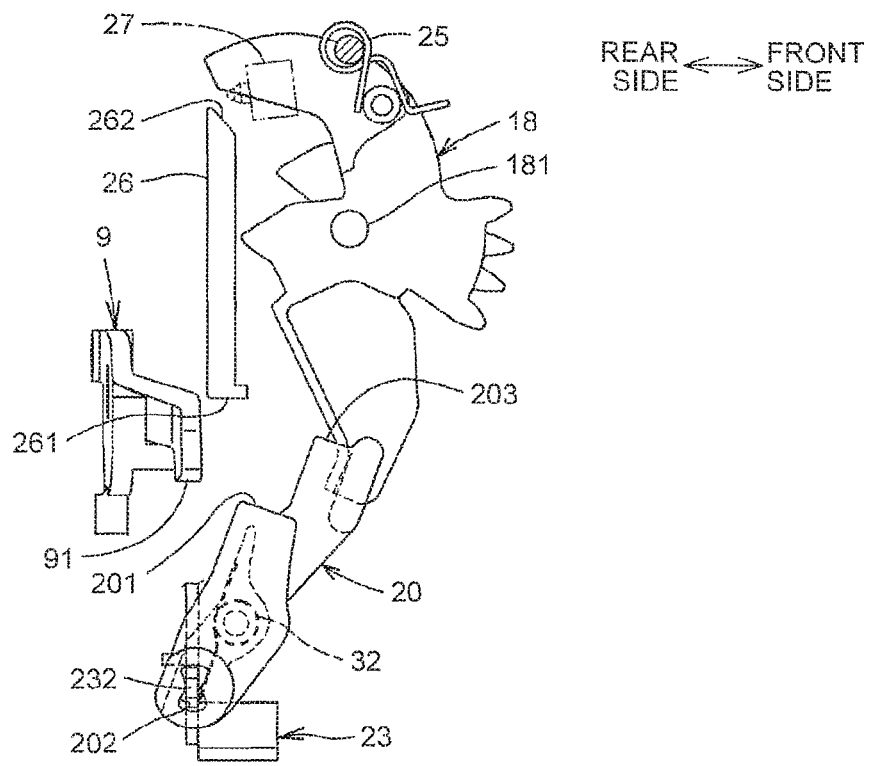
FIG. 11 is a side view of the main portions when the locking/unlocking mechanism is in a lock position.
Figure 13:
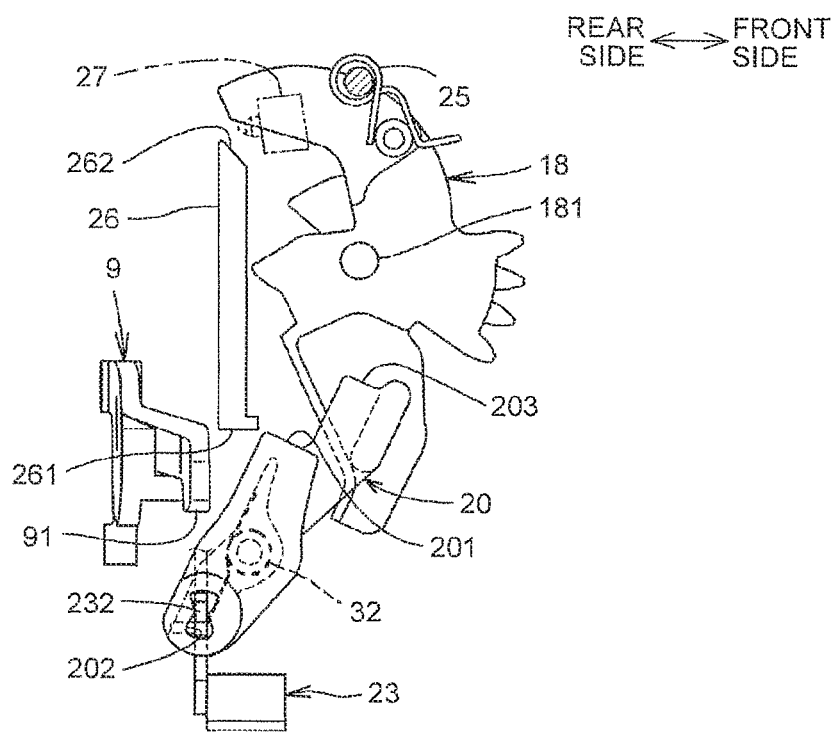
FIG. 13 is a side view of the main portions in the door-opening operation when the locking/unlocking mechanism is in the lock position.

In another case where the door D is in a fully closed state, and the locking/unlocking mechanism is in the lock position as illustrated in FIG. 11, even if the release operation of the open link 20 is performed in linking with the release operation of the outside lever 23, the releasing portion 201 makes a swinging movement idly toward the released portion 91 of the open lever 9, as illustrated in FIG. 13. Accordingly, since the open lever 9 cannot be pivoted to the release direction even if the release operation of the open link 20 has been performed, it is not possible to open the door.

(Main Portions According to the Present Invention)

Main portions according to the present invention will be described in the following.

The latch 7 includes, as illustrated mainly in FIGS. 6 and 8, a cam portion 73 bulging toward an upper portion of an outer periphery in a diameter direction, and a small-diameter portion 74 formed to be continuing to the cam portion 73.

The cam portion 73 is arc-shaped, having a predetermined length in the peripheral direction with about the latch shaft 10, with a shape bulging toward the diameter direction more than the small-diameter portion 74.

On a front-surface side of the body 4, a detection lever 30 and a door open/close detection switch 31 are provided. The detection lever 30 pivots in linking with the pivoting of the latch 7. The door open/close detection switch 31 turns on or off according to the pivoting position of the detection lever 30.

The detection lever 30 is arranged such that a substantially central portion in a longitudinal direction (vehicle inner and outer direction) is pivotally supported by a shaft 301 arranged in the front-rear direction at an upper portion of the front surface of the body 4. At the same time, the detection lever 30, as illustrated in FIGS. 7 and 9, is biased clockwise by a spring (not illustrated). On an end portion (right end portion in FIGS. 7 and 9), facing toward the vehicle outer side, of the detection lever 30, a detecting portion 302 is provided. The detecting portion 302 passes through a long hole 42 in a vertical direction on an upper portion of the body 4 to protrude at a side of the housing portion 41 of the body 4. The detecting portion 302 is capable of relatively sliding the cam portion 73 and the small-diameter portion 74, of the latch 7. Furthermore, on the other end (left end portion in FIGS. 7 and 9) on an opposite side across the shaft 301 of the detecting portion 302, a cam surface 303 which bulges forwardly is provided so as to cause the door open/close detection switch 31 to operate.

The detecting portion 302 on the detection lever 30 abuts the small-diameter portion 74 of the latch 7, as illustrated in FIG. 8, when the latch 7 is in the full-latch position. When the latch 7 is in a position other than the full-latch position, namely, in the half-latch position or the open position, the detecting portion 302 abuts the cam portion 73, as illustrated in FIG. 6. Consequently, when the latch 7 pivots from the full-latch position to the open position, the detecting portion 302 relatively moves from the small-diameter portion 74 to the cam portion 73, of the latch 7, the detection lever 30 pivots from a latch detection position illustrated in FIG. 9 to an unlatch detection position illustrated in FIG. 7, against a biasing force of the spring. Furthermore, when the latch 7 has moved from the open position to the full-latch position, the detection lever 30 pivots from the unlatch detection position to the latch detection position.

The door open/close detection switch 31, being provided at an upper portion of the body 4, is arranged so as to be facing the cam surface 303 of the detection lever 30. The door open/close detection switch 31 turns off by detaching from the cam surface 303 when the detection lever 30 has pivoted to the latch detection position. When the detection lever 30 has pivoted to the unlatch detection position, the door open/close detection switch 31 turns on by contacting the cam surface 303.

The motor 16 and various types of switches including the door open/close detection switch 31 are wired to a coupler 32 provided on an upper portion of the body 4. An external connector (not illustrated) is connected to the coupler 32, whereby the coupler 32 supplies battery power on vehicle to the motor 16, and transmits detection signals of various switches including the door open/close detection switch 31, to a control circuit device 100 mounted on the vehicle. The door open/close detection switch 31 is retained in a resin plate 34 insert-molded with wiring 33 illustrated in FIG. 5. This consequently facilitates wiring of the door open/close detection switch 31.

The operation unit 3 is further provided with a smart lever 26 and a smart lever detection switch 27 that detects operation of the smart lever 26.

The smart lever 26 is vertically-slidably supported on a front-surface side of body 4, and at the same time, biased downwardly by the biasing force of an internally-housed coil spring 28. The smart lever 26 normally stops at a non-operating position illustrated in FIGS. 7, 9 to 11, and 13. Furthermore, a tilted portion 262 capable with contacting the smart lever detection switch 27 is provided on an upper end of the smart lever 26.

In a case where the locking/unlocking mechanism is in a state of unlock position as illustrated in FIG. 10, when the open link 20 performs a release operation upwardly, an operating portion 203 formed on an upper end portion of the open link 20 abuts a lower end portion 261 of the smart lever 26 from the lower direction, as illustrated in FIG. 12, whereby the smart lever 26 moves upwardly against the biasing force of the coil spring 28. Alternatively, in a case where the locking/unlocking mechanism is in a state of lock position as illustrated in FIG. 11, even when the open link 20 performs the release operation, the operating portion 203 of the open link 20 does not abut the lower end portion 261 of the smart lever 26, as illustrated in FIG. 13. Accordingly, the smart lever 26 just stops in the non-operating position, not moving therefrom. Accordingly, the smart lever 26 moves upwardly only when the open link 20 performs the release operation from the unlock position. The smart lever 26 is irrelevant to the other operations; for example, the smart lever 26 does not move from the non-operating position when, for example, the open link 20 moves upwardly from the lock position, and when the open lever 9 has pivoted in linking with the opening and closing operation of the door D.

The smart lever detection switch 27, similarly to the door open/close detection switch 31, is supported by the resin plate 34. The switch detects operation of the smart lever 26 by contacting the tilted portion 262 of the smart lever 26 when the smart lever 26 has moved upwardly from the non-operating position. That is, the smart lever detection switch 27 transmits a door-opening operation detection signal to the control circuit device 100 only when the door-opening operation is performed for the outside handle OH or the inside handle IH, while the locking/unlocking mechanism is in the unlock position.

Figure 14:
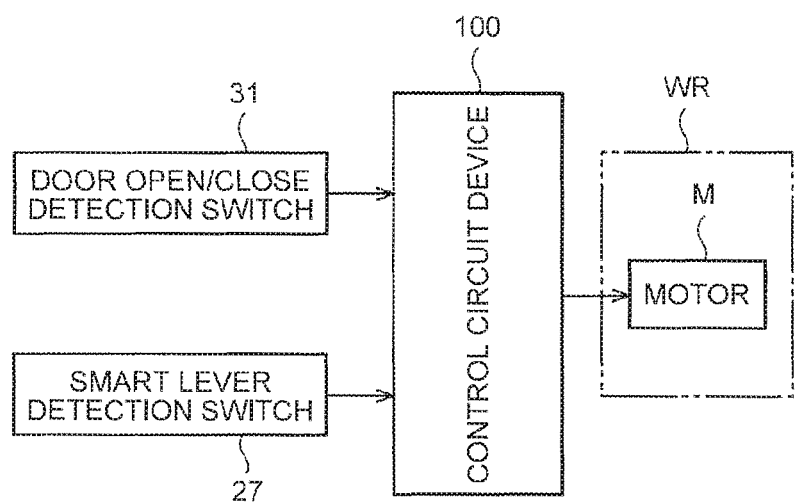
FIG. 14 is a block diagram illustrating control of a window regulator.

The control circuit device 100, as illustrated in FIG. 14, performs opening drive control of the motor M of the window regulator WR, for a predetermined time, so as to move the glass window G that is in a fully closed position as illustrated in a solid line in FIG. 1, to the half-open position illustrated in two-dot chain lines, by receiving a full-latch position detection signal of the latch 7 that is transmitted from the door open/close detection switch 31, namely, a close signal when the door D is closed, and the door-opening operation detection signal of the smart lever detection switch 27. When the door open/close detection switch 31 has detected that the door D has been closed, based on a detected change from the unlatch detection state to the latch detection state, the control circuit device 100 performs closing drive control of the motor M for a predetermined time corresponding to the time taken for a movement of the glass window G from a position where it is open for a predetermined amount to the fully closed position.

As described above, by performing, in linking with the opening operation of the door D, the opening drive of the motor M of the window regulator WR to perform the opening operation of the glass window G for a predetermined amount, it is possible to prevent the closing force of the door D from increasing due to increased indoor pressure at the instance of door D closing, and to close the door D with a lighter force.

The opening operation of the glass window G for a predetermined amount is executed based on the detection signal of a smart lever detection switch 27. The smart lever detection switch 27 detects the operation of the smart lever 26 that operates, in linking with the door-opening operation, only when the locking/unlocking mechanism is in the unlock position. Accordingly, it is possible to simplify the control of the control circuit device 100 without requiring complicated operating conditions.

The smart lever 26 operates only when the locking/unlocking mechanism is in the unlock position and the door opening operation is performed. The smart lever 26 does not operate in linking with any other operation, such as the opening and closing operation of the door D, for example. Therefore, the smart lever detection switch 27 transmits only signals related to the operating conditions, and does not transmit any erroneous signal that is not related to the operating conditions. Consequently, the control circuit device 100 can reliably perform the drive control of the motor M of the window regulator WR, based on the detection signal of the smart lever detection switch 27.

REFERENCE SIGNS LIST

1 DOOR LATCH DEVICE
2 MESHING UNIT
3 OPERATION UNIT
4 BODY
5 COVER PLATE
6 BACK PLATE
7 LATCH (MESHING MECHANISM)
8 RATCHET (MESHING MECHANISM)
9 OPEN LEVER
10 LATCH SHAFT
11 RATCHET SHAFT
12 SPRING
15 CASING
16 MOTOR
17 WORM WHEEL
18 LOCK LEVER (LOCKING/UNLOCKING MECHANISM)
19 KNOB LEVER (LOCKING/UNLOCKING MECHANISM)
20 OPEN LINK (LOCKING/UNLOCKING MECHANISM)
21 INSIDE LEVER
22 KEY LEVER
23 OUTSIDE LEVER
24 SPRING
25 SPRING
26 SMART LEVER
27 SMART LEVER DETECTION SWITCH
28 COIL SPRING
30 DETECTION LEVER
31 DOOR OPEN/CLOSE DETECTION SWITCH
32 COUPLER
33 WIRING
34 RESIN PLATE
41 HOUSING PORTION
42 LONG HOLE
71 FULL-LATCH ENGAGEMENT PORTION
72 HALF-LATCH ENGAGEMENT PORTION
73 CAM PORTION
74 SMALL-DIAMETER PORTION
91 RELEASED PORTION
100 CONTROL CIRCUIT DEVICE
171 SHAFT
181 SHAFT
191 SHAFT
201 RELEASING PORTION
202 CONNECTION HOLE
203 OPERATING PORTION
211 SHAFT
221 SHAFT
231 SHAFT
232 COUPLING PORTION
261 LOWER END PORTION
262 TILTED POTION
301 SHAFT
302 DETECTING PORTION
303 CAM SURFACE
D DOOR
DH DOOR HINGE
IH INSIDE HANDLE (OPERATION HANDLE)
G GLASS WINDOW
K KEY CYLINDER
LK LOCK KNOB
OH OUTSIDE HANDLE (OPERATION HANDLE)
WR WINDOW REGULATOR
M MOTOR (ELECTRIC DRIVING SOURCE)

The invention claimed is:

1. A door latch device for vehicle, comprising:
a meshing mechanism configured to be meshable with a striker when a door is closed;
an open link having a coupling portion, a releasing portion, and an operating portion at a lower, middle, and upper end parts, respectively, thereof, configured to be rotated around the coupling portion between an unlock position and a lock position, the unlock position being a position where an opening operation of an operation handle provided at the door is enabled and where meshing of the meshing mechanism is releasable, the lock position being a position where the opening operation of the operation handle provided at the door is disabled and where meshing of the meshing mechanism is unreleasable, and configured to perform a release operation to be moved upward when the opening operation of the operation handle is conducted;
an outside lever coupled to the open link via the coupling portion, the outside lever being configured to move up the open link upon the release operation;
a smart lever, having a lower end portion and an upper end portion on a lower end and an upper end, respectively, thereof, so that, when the open link is at the unlock position and is moved upward by the release operation, the lower end portion is in contact with the releasing portion of the open link and is moved upward and, in a case where the open link is at the unlock position, the lower end portion is not in contact with the releasing portion of the open link and is not moved upward even when the open link is moved upward by the release operation; and
a smart lever detection switch configured to detect that the smart lever is moved upward by the smart lever being in contact with the tilted upper end portion of the smart lever when the smart lever is moved upward,
wherein in a case where the open link is in the unlock position and a release operation of the operation handle is performed, an entirety of the open link is configured to be moved towards a side of the smart lever, without being rotated, to cause the upper end portion of the smart lever to be in contact with the smart lever switch so that the smart lever switch detects that the smart lever is moved upward, and
wherein when the open link is in the unlock position, the smart lever switch is used as a single sensor to detect a door-opening operation of the operation handle.

2. A door system for vehicle, comprising:

the door latch device for vehicle according to claim 1;

a door open/close detection switch configured to be detectable closing of a door;

a window regulator configured to be capable of opening and closing a glass window provided at the door using power of an electric driving source; and a control circuit device configured to control drive of the electric driving source, wherein the control circuit device performs opening drive control of the electric driving source for a predetermined time, triggered by detection of operation of the smart lever by the smart lever detection switch when the door open/close detection switch is detecting the closing of the door, and performs closing drive control of the electric driving source triggered by detection of closing of the door by the door open/close detection switch.

* * * * *